(12) United States Patent
Bregonzio et al.

(10) Patent No.: US 10,889,041 B2
(45) Date of Patent: Jan. 12, 2021

(54) METHOD, DEVICE AND WORK STATION FOR APPLYING PROTECTIVE SHEETING OF POLYMER MATERIAL TO A PIPELINE, AND COMPUTER PROGRAM FOR IMPLEMENTING SUCH A METHOD

(71) Applicant: SAIPEM S.p.A., San Donato Milanese (IT)

(72) Inventors: Valerio Bregonzio, San Giuliano Milanese (IT); Momtchil Kaltchev, Carpiano (IT)

(73) Assignee: SAIPEM S.P.A., San Donato Milanese (IT)

( * ) Notice: Subject to any disclaimer, the term of this patent is extended or adjusted under 35 U.S.C. 154(b) by 580 days.

(21) Appl. No.: 14/433,236

(22) PCT Filed: Oct. 8, 2013

(86) PCT No.: PCT/IB2013/059216
§ 371 (c)(1),
(2) Date: Apr. 2, 2015

(87) PCT Pub. No.: WO2014/057426
PCT Pub. Date: Apr. 17, 2014

(65) Prior Publication Data
US 2015/0266224 A1    Sep. 24, 2015

(30) Foreign Application Priority Data
Oct. 8, 2012    (IT) ............................... MI2012A1679

(51) Int. Cl.
*B29C 48/00*    (2019.01)
*B29C 48/151*    (2019.01)
(Continued)

(52) U.S. Cl.
CPC ........ *B29C 48/151* (2019.02); *B29C 48/0011* (2019.02); *B29C 48/0021* (2019.02);
(Continued)

(58) Field of Classification Search
CPC ....... B29C 63/06; B29C 47/24; B29C 47/122; B29C 47/124; B29C 47/0837;
(Continued)

(56) References Cited

U.S. PATENT DOCUMENTS 1,601,029 A * 9/1926 Ligonnet ................. B28B 21/70
156/296
2,231,250 A * 2/1941 Bryan ..................... F16L 58/12
118/407

(Continued)

FOREIGN PATENT DOCUMENTS

EP    1 985 909    10/2008
EP    2 298 531    3/2011
(Continued)

OTHER PUBLICATIONS

International Search Report and Written Opinion for International Application No. PCT/IB2013/059216 dated Feb. 12, 2014.
(Continued)

*Primary Examiner* — Matthew J Daniels
*Assistant Examiner* — Andrew D Graham
(74) *Attorney, Agent, or Firm* — Neal, Gerber & Eisenberg LLP

(57) ABSTRACT

A method of applying protective sheeting of polymer material to a pipeline, such as on a J-lay rig, includes the steps of driving a carriage along an annular path about the pipeline; extruding and simultaneously winding the protective sheeting about the pipeline via an end extrusion die fitted to the carriage; compressing the protective sheeting on the pipeline, directly downstream from the end extrusion die, so the
(Continued)

protective sheeting adheres to the pipeline; and controlling the drive, extrusion, and compression steps so that the time lapse between expulsion of a cross section of protective sheeting from the end extrusion die and compression of the same cross section of protective sheeting is less than one second.

34 Claims, 9 Drawing Sheets

(51) Int. Cl.
| | |
|---|---|
| B29C 48/25 | (2019.01) |
| B29C 65/00 | (2006.01) |
| B29C 65/02 | (2006.01) |
| F16L 13/02 | (2006.01) |
| B29C 63/06 | (2006.01) |
| F16L 58/10 | (2006.01) |
| F16L 58/18 | (2006.01) |
| B29C 48/08 | (2019.01) |
| B29C 48/35 | (2019.01) |
| B29C 65/52 | (2006.01) |
| B29C 48/02 | (2019.01) |
| B29C 65/48 | (2006.01) |
| B29C 48/305 | (2019.01) |
| B29K 23/00 | (2006.01) |
| B29L 9/00 | (2006.01) |
| B29L 23/00 | (2006.01) |

(52) U.S. Cl.
CPC .......... *B29C 48/08* (2019.02); *B29C 48/266* (2019.02); *B29C 63/06* (2013.01); *B29C 65/028* (2013.01); *B29C 66/112* (2013.01); *B29C 66/1122* (2013.01); *B29C 66/1286* (2013.01); *B29C 66/12821* (2013.01); *B29C 66/5326* (2013.01); *B29C 66/652* (2013.01); *B29C 66/72321* (2013.01); *B29C 66/742* (2013.01); *B29C 66/81431* (2013.01); *B29C 66/8362* (2013.01); *B29C 66/9121* (2013.01); *B29C 66/9141* (2013.01); *B29C 66/961* (2013.01); *F16L 13/0272* (2013.01); *F16L 58/109* (2013.01); *F16L 58/1063* (2013.01); *F16L 58/181* (2013.01); *B29C 48/02* (2019.02); *B29C 48/305* (2019.02); *B29C 48/35* (2019.02); *B29C 65/483* (2013.01); *B29C 65/522* (2013.01); *B29C 66/0242* (2013.01); *B29C 66/71* (2013.01); *B29C 66/7392* (2013.01); *B29C 66/81423* (2013.01); *B29C 66/81457* (2013.01); *B29C 66/81465* (2013.01); *B29K 2023/00* (2013.01); *B29L 2009/00* (2013.01); *B29L 2023/22* (2013.01)

(58) Field of Classification Search
CPC . B29C 47/085; B29C 47/886; B29K 2023/00; F16L 13/00; F16L 58/10; F16L 58/02; F16L 58/04
See application file for complete search history.

(56) References Cited

U.S. PATENT DOCUMENTS

| | | | | |
|---|---|---|---|---|
| 2,754,544 | A * | 7/1956 | Bicher, Jr. | B29C 47/32 425/224 |
| 2,761,791 | A * | 9/1956 | Russell | B05C 5/007 118/410 |
| 2,821,746 | A * | 2/1958 | Bicher, Jr. | B29C 47/14 264/175 |
| 2,863,204 | A * | 12/1958 | Timothy | B29C 63/00 156/188 |
| 2,901,770 | A * | 9/1959 | Beck | B29C 47/065 156/243 |
| 2,932,855 | A * | 4/1960 | Bartlett | B29C 47/0021 118/412 |
| 3,033,724 | A * | 5/1962 | Stokes | B29C 63/105 138/129 |
| 3,121,255 | A * | 2/1964 | Henning | B29C 47/128 264/171.17 |
| 3,302,239 | A * | 2/1967 | Senecal | B05C 5/0254 118/411 |
| 3,304,352 | A * | 2/1967 | Gerow | B29C 47/0026 264/209.5 |
| 3,462,332 | A * | 8/1969 | Goto | B29C 47/0021 156/244.24 |
| 3,599,435 | A * | 8/1971 | Kolb | F16L 1/18 138/141 |
| 3,609,810 | A * | 10/1971 | Coghill | B29C 47/32 118/410 |
| 3,740,958 | A * | 6/1973 | Cadwell | B29C 47/00 138/103 |
| 3,797,987 | A * | 3/1974 | Marion | B29O 47/0021 425/463 |
| 3,802,908 | A * | 4/1974 | Emmons | B29C 63/105 118/314 |
| 3,825,379 | A * | 7/1974 | Lohkamp | D01D 4/025 264/211.17 |
| 3,865,535 | A * | 2/1975 | Langdon | B29C 47/30 425/186 |
| 3,868,265 | A * | 2/1975 | Sakai | B05D 3/12 264/279 |
| 3,879,158 | A * | 4/1975 | Schele | B29C 47/24 425/326.1 |
| 3,913,625 | A * | 10/1975 | Gazda | B29C 47/021 138/127 |
| 3,930,923 | A * | 1/1976 | Elliott | B29C 47/8845 156/244.17 |
| 3,940,221 | A * | 2/1976 | Nissel | B29C 47/0816 425/141 |
| 4,062,710 | A * | 12/1977 | Muckenheim | F16L 9/02 156/187 |
| 4,283,168 | A * | 8/1981 | Miller | B29C 47/165 156/244.15 |
| 4,309,869 | A * | 1/1982 | Boyce | B29C 65/00 138/111 |
| 4,366,972 | A * | 1/1983 | Franklin | B29C 47/021 156/244.15 |
| 4,676,695 | A * | 6/1987 | Duthweiler | E21B 43/01 405/131 |
| 4,721,410 | A * | 1/1988 | Recalde | F16L 1/206 405/155 |
| 4,808,031 | A * | 2/1989 | Baker | F16L 1/123 138/172 |
| 5,030,079 | A * | 7/1991 | Benzing, II | B29C 47/32 264/175 |
| 5,328,648 | A * | 7/1994 | McBrien | B29C 44/1219 156/304.2 |
| 6,065,781 | A * | 5/2000 | Titus | F16L 13/0272 285/288.1 |
| 6,257,863 | B1 * | 7/2001 | Otte | B29C 47/0033 425/191 |
| 8,523,488 | B2 * | 9/2013 | Bregonzio | F16L 13/0272 285/288.1 |
| 2002/0036362 | A1 * | 3/2002 | Chigira | B29C 47/0021 264/40.6 |
| 2002/0053389 | A1 * | 5/2002 | Martin | B29C 47/22 156/126 |
| 2002/0114858 | A1 * | 8/2002 | Castillo | B29C 47/0023 425/133.1 |
| 2003/0206990 | A1 * | 11/2003 | Edmondson | B29C 47/0016 425/466 |
| 2004/0070105 | A1 * | 4/2004 | Rasmussen | A23G 3/2015 264/171.26 |
| 2004/0241327 | A1 * | 12/2004 | Wyatt | B05C 5/001 427/355 |

(56) References Cited

U.S. PATENT DOCUMENTS

| | | | | |
|---|---|---|---|---|
| 2004/0247730 | A1* | 12/2004 | Rasmussen | B29C 47/92 425/377 |
| 2005/0061436 | A1* | 3/2005 | Duns | B29C 63/048 156/322 |
| 2005/0119414 | A1* | 6/2005 | Sasagawa | C08F 8/00 525/242 |
| 2005/0184426 | A1* | 8/2005 | Bomba | B29C 47/32 264/166 |
| 2005/0260407 | A1* | 11/2005 | Anand | B29C 47/0021 428/364 |
| 2005/0260408 | A1* | 11/2005 | Anand | B29C 47/0023 428/364 |
| 2007/0034316 | A1* | 2/2007 | Perez | B29C 63/14 156/95 |
| 2007/0231479 | A1* | 10/2007 | Ogawa | B05C 5/0254 427/162 |
| 2007/0277923 | A1* | 12/2007 | Wood | B29C 63/06 156/187 |
| 2009/0065124 | A1* | 3/2009 | Culzoni | B05D 7/146 156/153 |
| 2009/0098296 | A1* | 4/2009 | Finne | B29C 47/0023 427/314 |
| 2009/0102090 | A1* | 4/2009 | Mottahedeh | B29C 53/083 264/232 |
| 2010/0065614 | A1* | 3/2010 | Cittadini Bellini | B23K 37/0533 228/176 |
| 2010/0133324 | A1* | 6/2010 | Leiden | B29C 47/0866 228/176 |
| 2010/0186881 | A1* | 7/2010 | Bergonzio | B29C 63/06 156/187 |
| 2010/0227190 | A1* | 9/2010 | Lochte | B05C 5/001 428/586 |
| 2011/0045295 | A1* | 2/2011 | Vogt | B29C 41/003 428/375 |
| 2011/0217497 | A1* | 9/2011 | Leiden | B32B 1/08 428/35.9 |
| 2011/0290409 | A1* | 12/2011 | Jacques | B29C 47/0023 156/185 |
| 2012/0100339 | A1* | 4/2012 | Haynes | B29C 43/222 428/141 |
| 2012/0171320 | A1* | 7/2012 | Vargo | B29C 47/32 425/367 |
| 2012/0231168 | A1* | 9/2012 | Leiden | B23K 9/18 427/359 |
| 2012/0291903 | A1* | 11/2012 | Ekelund | B29C 53/805 138/97 |
| 2012/0308755 | A1* | 12/2012 | Gorman | B29C 47/0021 428/43 |
| 2013/0341320 | A1* | 12/2013 | Tailor | F16L 13/0272 219/643 |
| 2014/0048970 | A1* | 2/2014 | Batchelder | B29C 67/0055 264/129 |

FOREIGN PATENT DOCUMENTS

| | | |
|---|---|---|
| EP | 2 535 168 | 12/2012 |
| WO | WO 2008/071773 | 6/2008 |
| WO | WO 2008/107759 | 9/2008 |
| WO | WO 2010/049353 | 5/2010 |
| WO | WO 2011/033176 | 3/2011 |

OTHER PUBLICATIONS

Notification of Transmittal of the International Preliminary Report on Patentablitty (Form PCT/IPEA/416) for International Application No. PCT/IB2013/059216 dated Sep. 24, 2014, and International Preliminary Report on Patentability (Form PCT/IPEA/409) for International Application No. PCT/IB2013/059216 dated Sep. 24, 2014.

* cited by examiner

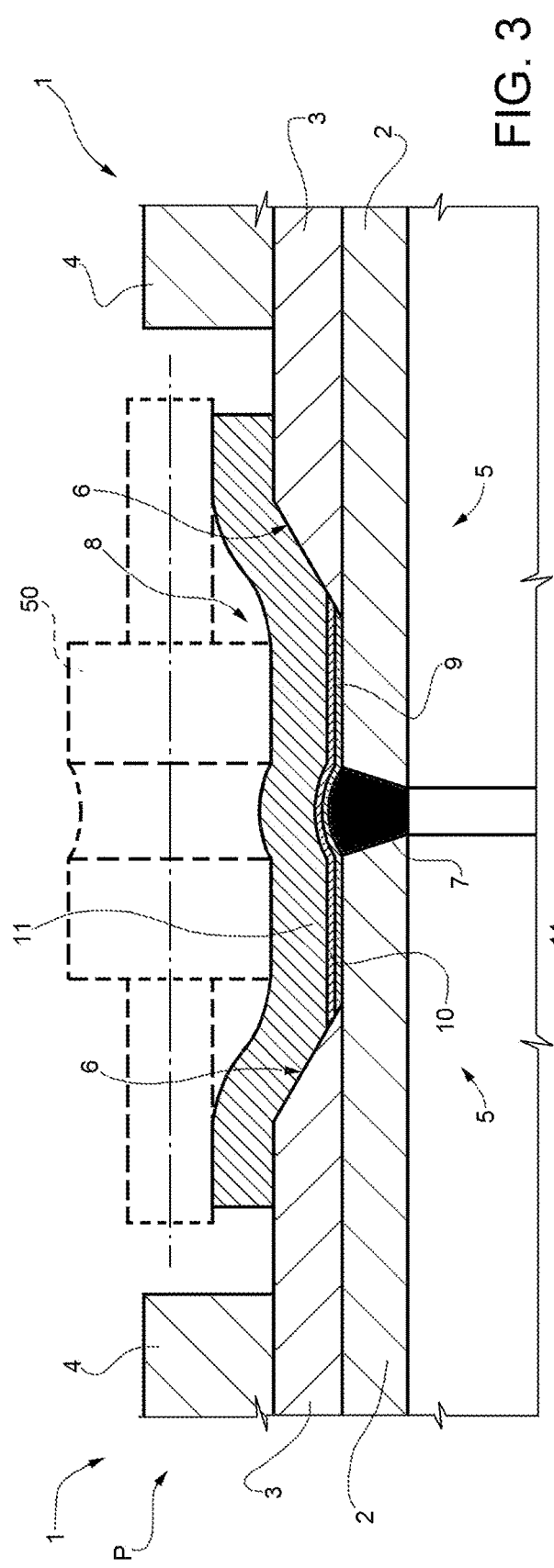
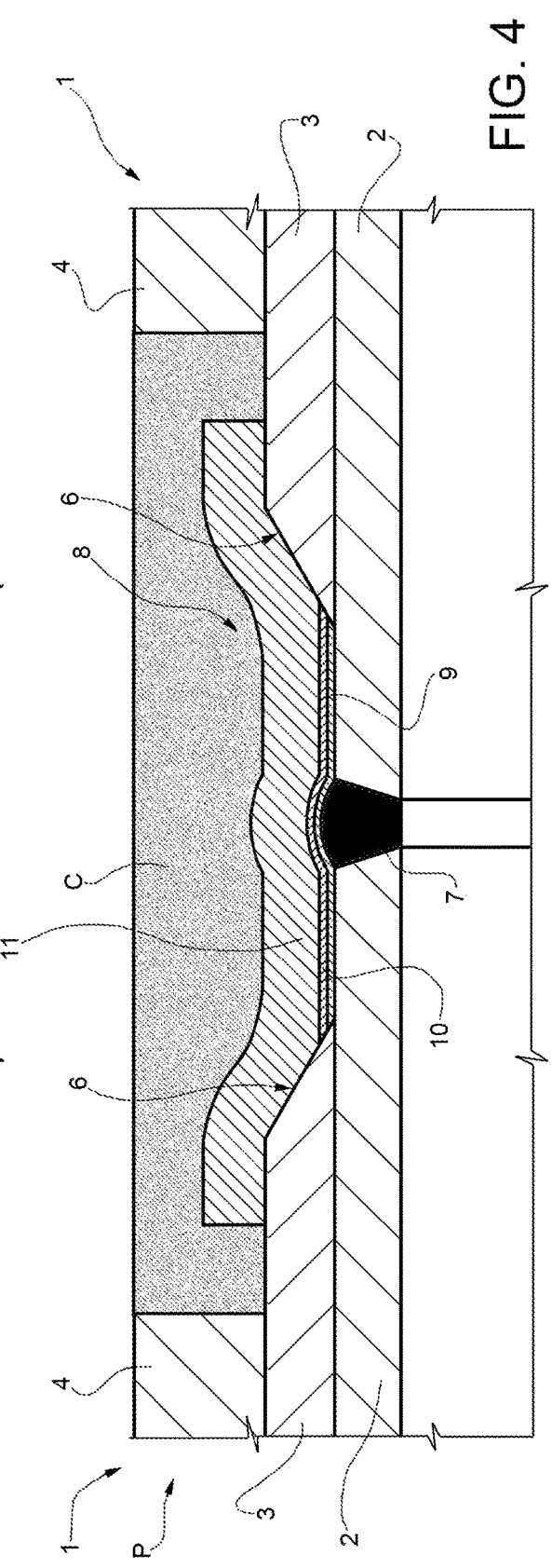

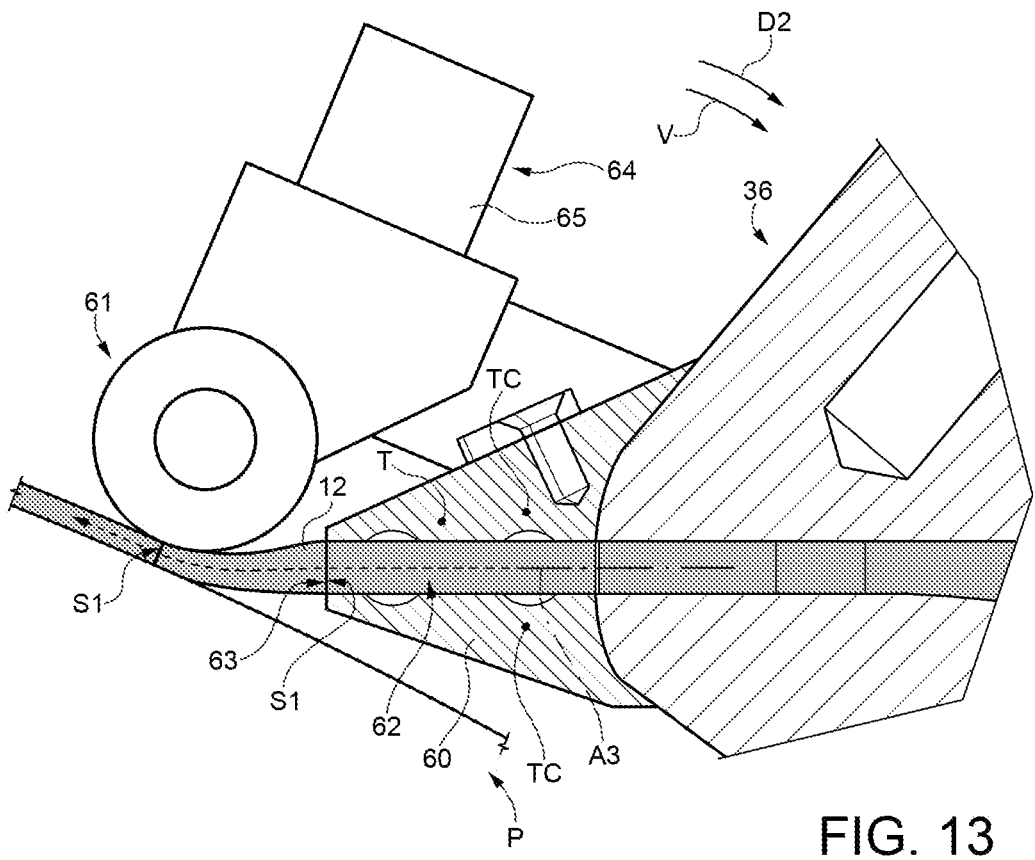

METHOD, DEVICE AND WORK STATION FOR APPLYING PROTECTIVE SHEETING OF POLYMER MATERIAL TO A PIPELINE, AND COMPUTER PROGRAM FOR IMPLEMENTING SUCH A METHOD

PRIORITY CLAIM

This application is a national stage application of PCT/IB2013/059216, filed on Oct. 8, 2013, which claims the benefit of and priority to Italian Patent Application No. MI2012A 001679, filed on Oct. 8, 2012, the entire contents of which are each incorporated by reference herein.

BACKGROUND

Underwater pipelines are normally constructed by joining the facing free ends of two adjacent pipe sections, aligned along a longitudinal axis, to form a cutback; and winding protective sheeting about the cutback. Such pipelines are composed of pipe sections joined to one another to cover distances of hundreds of kilometres. The pipe sections are normally of 12-metre unit length and relatively large diameter, ranging from 0.2 metres to 1.5 metres. Each pipe section comprises a metal cylinder; a first polymer coating to protect the metal cylinder; and possibly a second coating of Gunite or concrete which acts as ballast. In some known applications, the second coating is not required, so the pipe sections and pipeline are left without. To weld the metal cylinders together, the free ends of each pipe section have no first or second coating. And the pipe sections are joined at land-based installations, or on board laying vessels, which also lay the pipeline as the pipeline is constructed.

Joining the pipe sections comprises welding the metal cylinders, normally with a quantity or number of weld passes; and restoring the first and, if any, the second coating. Once an annular weld bead is formed between two adjacent metal cylinders, the cutback extends astride the annular weld bead, along a portion with no first or second coating. In other words, the cutback is substantially defined by the free ends of the pipe sections, extends axially between two end portions of the first coating, and must be covered with protective sheeting to prevent corrosion.

Restoring the first coating along the cutback is known as 'field joint coating', and comprises coating the cutback with normally three layers of polymer material to protect and ensure adhesion of the layers to the metal cylinders. Restoring the first coating along the cutback comprises heating (e.g., induction heating), the cutback to a temperature of 250° C.; spraying the cutback with powdered epoxy resin (FBE: Fusion Bonded Epoxy) which, on contacting the cutback, forms a relatively thin layer or 'primer'; spraying the cutback, on top of the first layer, with a modified adhesive co-polymer which, on contacting the first layer, forms a relatively thin second layer; and applying a third layer or so-called 'top coat', which also extends partly over the first coating. The second coating, if any, is then restored.

Welding, non-destructive weld testing, and restoration of the first and second coatings are carried out at work stations equally spaced along the path of the pipe sections (or of the pipeline being built, if the pipe sections are joined to the pipeline). So, the pipe sections are fed in steps and stopped for a given length of time at each work station.

Known methods of applying the third layer to restore the first coating comprise winding extremely thick protective sheeting about the cutback. The protective sheeting is formed by extrusion, and is wound about the cutback simultaneously as the protective sheeting is extruded. This method is described in Applicant's PCT Patent Application No. 2008/071773; in European Patent Application No. 1,985,909; in PCT Patent Application No. 2010/049353; and in PCT Patent Application No. 2011/033176. In the methods described in these documents, the protective sheeting is applied by an extrusion head mounted on a carriage, which runs along an annular path about the longitudinal axis of the pipeline, and the polymer material is plastified by a plastifying device located close to the pipeline and either connectable selectively or hose-connected to the extrusion head. Both ways of feeding the soft polymer material to the extrusion head have certain drawbacks, due to the physical characteristics of the polymer material which, to be kept soft, must be heated to within a given temperature range.

The known methods described have proved extremely dependable when applying protective sheeting to substantially horizontal or only slightly tilted pipelines, but known methods and equipment have shown certain drawbacks when applying protective sheeting to substantially vertical pipelines, or pipelines tilted sharply with respect to the horizontal. Applying protective sheeting to a substantially vertical or sharply tilted pipeline is a situation encountered when working with a J-lay rig, which is mounted on board a laying vessel and used for assembling pipe sections and laying pipelines in relatively deep water. In these conditions, the thickness of the extruded-on protective sheeting has been found to vary in a direction parallel to the pipeline axis. And, in some cases, the leading end portion of the protective sheeting fails to adhere to the substrate.

SUMMARY

The present disclosure relates to a method of applying protective sheeting of polymer material to a pipeline, in particular about a cutback of a substantially vertical pipeline.

More specifically, the method according to the present disclosure forms part of a pipeline construction method, in particular for constructing underwater pipelines to be laid on the bed of a body of water, to which the following description refers purely by way of example.

It is an advantage of the present disclosure to provide a method of applying protective sheeting of polymer material to a pipeline, configured to eliminate certain of the drawbacks of certain of the known art.

According to the present disclosure, there is provided a method of applying protective sheeting of polymer material to a pipeline, such as on a J-lay rig, the method comprising the steps of driving a carriage along an annular path about the pipeline; extruding and simultaneously winding protective sheeting about the pipeline utilizing an end extrusion die fitted to the carriage; compressing the protective sheeting on the pipeline, directly downstream from the end extrusion die, so the protective sheeting adheres to the pipeline; and controlling the drive, extrusion, and compression steps so that the time lapse between expulsion of a cross section of protective sheeting from the end extrusion die and compression of the same cross section of protective sheeting is less than one second. This way, the soft protective sheeting is prevented from deforming between the end extrusion die and the compression area. And compressing the protective sheeting on the pipeline cools the protective sheeting faster and so makes the protective sheeting less deformable.

In certain embodiments of the present disclosure, the method comprises the step of compressing the protective sheeting using a pressure roller located downstream from the end extrusion die.

The roller provides for compressing the protective sheeting without inducing any noticeable shear stress in the sheeting.

In certain embodiments of the present disclosure, the method comprises adjusting the distance between the pressure roller and the end extrusion die as a function of extrusion speed.

The possibility of adjusting the distance between the pressure roller and the end extrusion die enables the method to be used for different travelling speeds of the end extrusion die.

In certain embodiments of the present disclosure, the method comprises rotating the pressure roller so that the surface speed of the pressure roller equals the travelling speed of the end extrusion die. This way, any shear stress induced in the protective sheeting by the roller is eliminated.

In certain embodiments, the method comprises the step of extruding the protective sheeting at a designated or given extrusion speed, and advancing the end extrusion die at a speed substantially equal to the extrusion speed. This way, the protective sheeting is prevented from stretching or gathering.

In certain embodiments of the present disclosure, the end extrusion die has an extrusion channel, which terminates in an extrusion port having at least one substantially straight portion extending along an axis; the method comprising tilting the end extrusion die with respect to the pipeline, so that the axis forms an angle of incidence of less than 30° with the tangent to the pipeline. This prevents the protective sheeting from curving sharply.

In certain embodiments of the present disclosure, the method comprises adjusting the position of the extrusion port with respect to the pipeline between a minimum (radial) distance of less than 10 mm, and a maximum distance of 20 mm or more. Utilizing this adjustment, the extrusion port can be positioned very close to the pipeline, and the sheeting released practically contacting the pipeline.

In certain embodiments, the method comprises heating the end extrusion die as a function of the characteristics of the polymer material of which the protective sheeting is made. This enables control of the plasticity of the material issuing from the extrusion port.

In certain embodiments, the method comprises heating the end extrusion die as a function of extrusion speed.

In certain embodiments, the method comprises further compressing the protective sheeting on the pipeline, downstream from compression of the protective sheeting. In other words, one compression fixes the protective sheeting to the pipeline, improves adhesion and accelerates cooling of the protective sheeting, and permits further, firmer, compression to prevent the formation of air bubbles.

In certain embodiments, the further compression is exerted using a further pressure roller.

The method comprises plastifying the polymer material on board the carriage, or plastifying the polymer material at a station close to the carriage, and transferring the plastified material to the carriage during a stop stage of the carriage.

In certain embodiments, the method comprises driving the carriage before the protective sheeting is extruded. This way, by the time application of the sheeting commences, the carriage is travelling at constant speed, thus reducing the length of time the end of the sheeting is left unsupported and subject to uncontrolled deformation.

In certain embodiments, the method comprises stopping extrusion of the protective sheeting utilizing an elongated shutter having a semicircular cross section and housed inside the end extrusion die. This reduces polymer material flash formed when commencing application of the protective sheeting and when arresting extrusion, and which could impair the quality of the coating.

It is a further advantage of the present disclosure to provide a device configured to apply protective sheeting to a pipeline, configured to eliminate certain of the drawbacks of certain of the known art.

According to the present disclosure, there is provided a device configured to apply protective sheeting of polymer material to a pipeline, such as on a J-lay rig, the device comprising a carriage movable along an annular path about the pipeline; an end extrusion die fitted to the carriage and configured to simultaneously extrude and wind protective sheeting of polymer material about the pipeline; and a pressure roller connected to the carriage and configured to compress the protective sheeting on the pipeline so the protective sheeting adheres to the pipeline; the end extrusion die and the pressure roller being configured and located so that the maximum distance between the pressure roller and the end extrusion die is less than 50 mm. This way, the protective sheeting is prevented from deforming as the protective sheeting issues from the end extrusion die.

It is a further advantage of the present disclosure to provide a work station.

According to the present disclosure, there is provided a work station configured to apply protective sheeting to a pipeline; the work station being located on a J-lay rig of a laying vessel, and comprising a device with one or more of the characteristics described above.

By virtue of the present disclosure, application of the protective sheeting is not greatly affected by the tilt of the J-lay rig.

It is a further advantage of the present disclosure to provide a computer program configured to control the device.

According to the present disclosure, there is provided a computer program loadable directly into a memory of a computer and configured, when implemented by the computer, to control a device in accordance with the present disclosure, and to perform the steps in the method according to the present disclosure.

Additional features and advantages are described in, and will be apparent from the following Detailed Description and the figures.

BRIEF DESCRIPTION OF THE DRAWINGS

Certain embodiments of the present disclosure will be described with reference to the attached drawings, in which:

FIGS. 3 and 4 show larger-scale axial sections, with parts removed for clarity, of pipe sections at various stages in the method according to the present disclosure;

FIG. 13 shows a section, with parts removed for clarity, of a detail of the FIG. 5 device in accordance with an alternative embodiment of the present disclosure; and FIG. 14 shows a section, with parts removed for clarity, of a detail of the device in accordance with a variation of the present disclosure.

DETAILED DESCRIPTION

Figure 1:
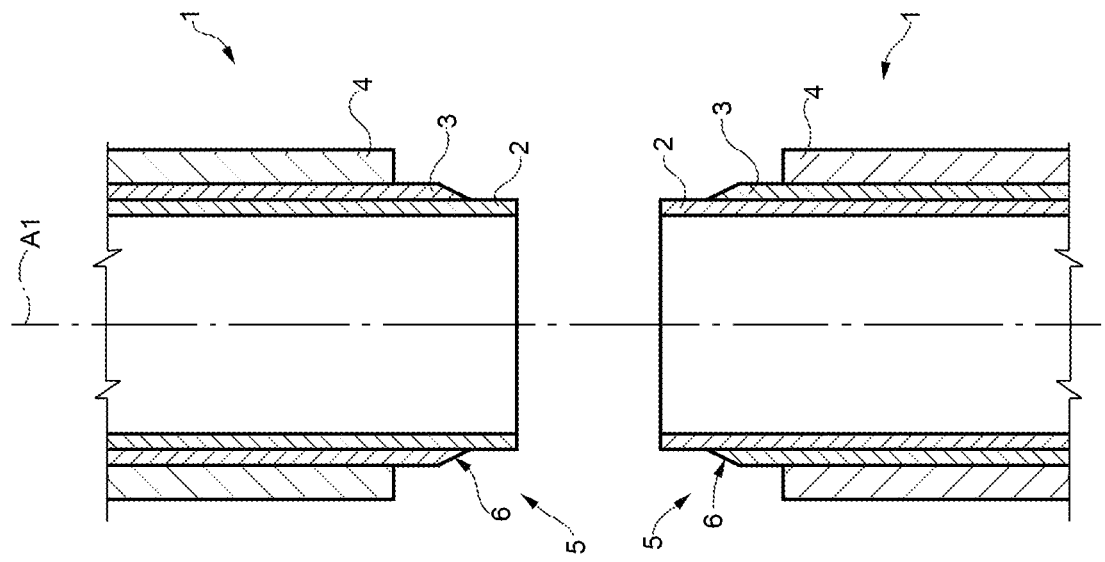
FIGS. 1 and 2 show axial sections, with parts removed for clarity, of pipe sections at various joining stages.

Referring now to the example embodiments of the present disclosure illustrated in FIGS. 1 to 14, number 1 in FIG. 1 indicates two pipe sections aligned along an axis A1. Each pipe section 1 comprises a metal cylinder 2; a first polymer coating 3, normally of polyethylene or polypropylene, configured to contact and protect metal cylinder 2 from corrosion; and a second coating 4 of Gunite or concrete, which acts as ballast.

In an alternative embodiment (not shown in the drawings), the pipe sections have no second coating.

Figure 2:
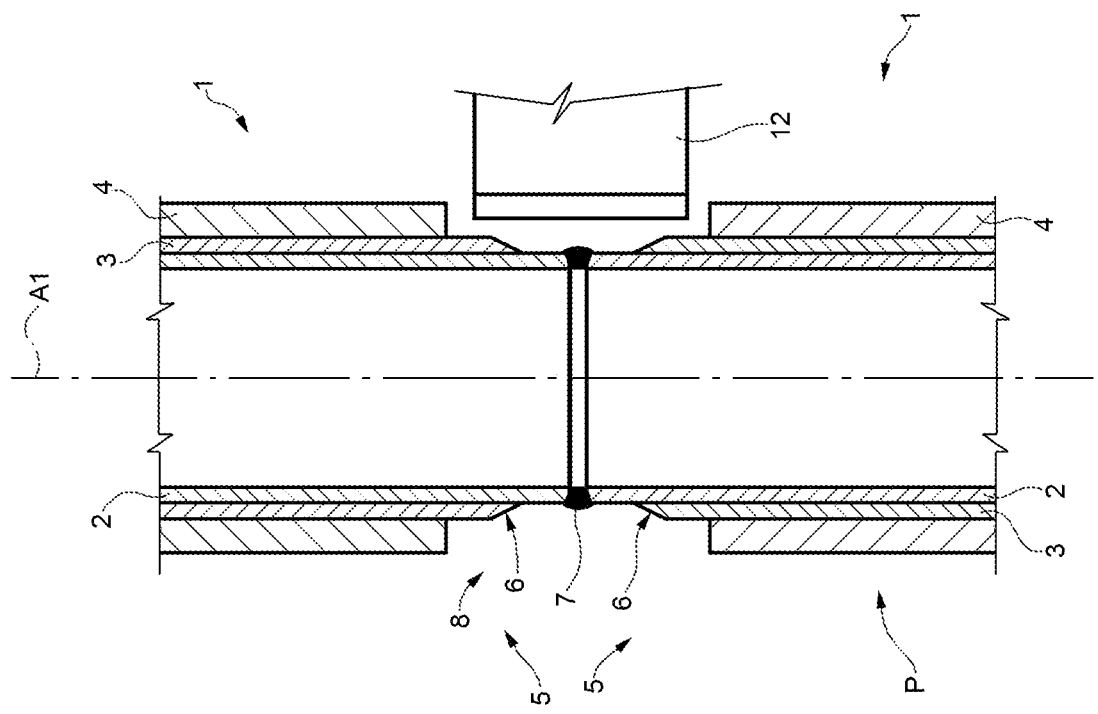

Each pipe section 1 has two opposite free ends 5 (only one shown in FIGS. 1 and 2) with no first coating 3 and no second coating 4. First coating 3 has a bevel 6 at each free end 5. Two successive pipe sections 1, aligned along longitudinal axis A1, are positioned with free ends 5 parallel, facing, and close to each other, and are welded, possibly in a quantity or number of weld passes, to form an annular weld bead 7 between the two pipe sections 1 (FIG. 2). As shown in FIG. 2, two welded pipe sections 1 form an annular joint 8 (hereinafter referred to as a cutback), which extends along longitudinal axis A1, between two successive bevels 6 of first coating 3, and astride annular weld bead 7.

Joining pipe sections 1 forms a pipeline indicated as a whole by P. In the present description, pipeline P is also intended to include the pipeline as the pipeline is being built, and formed, for example, by only two joined pipe sections 1.

In addition to welding metal cylinders 2, joining pipe sections 1 also comprises restoring first coating 3, and possibly also second coating 4, at cutback 8. Restoring first coating 3 comprises grit blasting cutback 8; induction heating cutback 8 to a temperature of roughly 250° C.; and applying a layer 9, a layer 10, and a layer 11 of polymer material (FIG. 3) in rapid succession to cutback 8. In FIG. 3, the thickness of layers 9, 10 and 11 is exaggerated for the sake of clarity.

Figure 5:
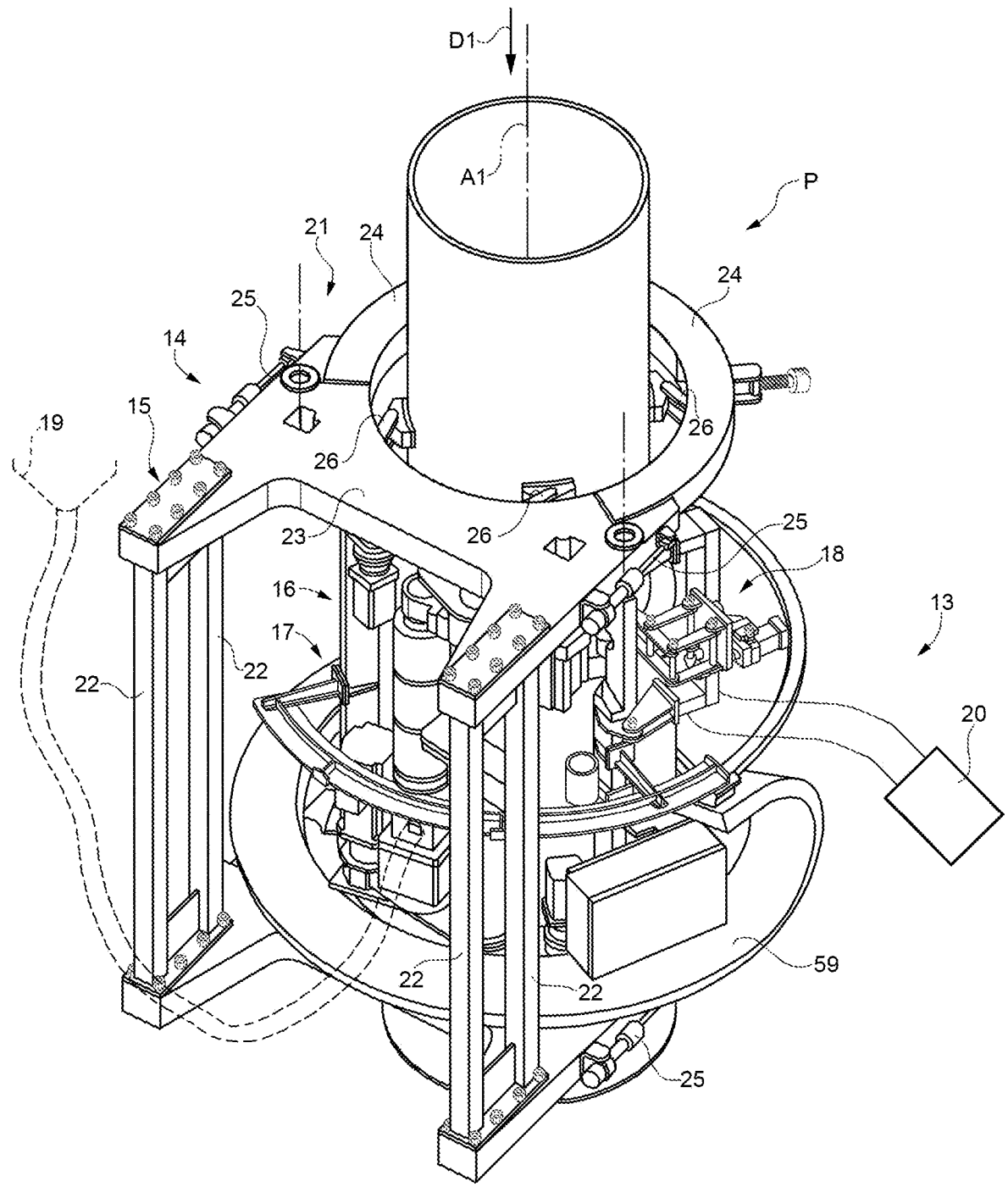
FIG. 5 shows a view in perspective, with parts removed for clarity, of the device configured to apply protective sheeting of polymer material according to the present disclosure.

With reference to FIG. 3, layer 9 is 100-500 micron thick, and is made of epoxy resin (FBE: Fusion Bonded Epoxy), which is applied in powdered form to cutback 8 using a spray gun (not shown in the drawings). Layer 10 is 100-500 micron thick, and is made of a modified co-polymer, normally CMPE or CMPP, which is applied in powdered form to cutback 8, on top of layer 9, using a spray gun (not shown in the drawings). Layer 11 is 2-5 mm thick, and is made of a polymer, such as polyolefin, CMPE or CMPP, which is applied by winding a single protective sheeting 12 of polymer material about cutback 8 at a work station 13, as shown in FIG. 5. In the example shown, protective sheeting 12 is wound about cutback 8 at station 13 (FIG. 5). Protective sheeting 12 is wider than cutback 8 (measured along longitudinal axis A1—FIG. 2) so as to overlap first coatings 3 of both joined pipe sections 1 and bevels 6, and is long enough to wind completely around the circumference of cutback 8 (FIG. 2) and to overlap at the ends.

Protective sheeting 12 is wound about pipeline P as protective sheeting is extruded.

With reference to FIG. 4, second coating 4 is restored with a layer of tar C or synthetic resins.

Number 14 in FIG. 5 indicates a device configured to plastify the polymer material of which protective sheeting 12 is made (FIG. 2), and to extrude and simultaneously wind protective sheeting 12 (FIG. 2) about pipeline P.

Construction of pipeline P, in particular on a J-lay rig of a laying vessel (neither shown in the drawings) comprises feeding pipeline P in steps in a direction D1 parallel to longitudinal axis A1, which is substantially vertical or at any rate tilted sharply to the horizontal; and fixing device 14 to cutback 8 of pipeline P. Device 14 is located at work station 13, and comprises a frame 15; a carriage 16 movable along frame 15; a plastifying and extrusion assembly 17 mounted on carriage 16; a rolling assembly 18 mounted on carriage 16; a hopper 19 configured to feed solid polymer material to plastifying and extrusion assembly 17; and a computer 20 connected to carriage 16. Frame 15 comprises two grippers 21 (only one shown in FIG. 5) facing each other and spaced apart; and beams 22 rigidly connecting grippers 21. Each gripper 21 is annular, and has three complementary sectors 23, 24 defining a ring. Sectors 23 of grippers 21 are connected rigidly to each other by beams 22; and the two sectors 24 of each gripper 21 are hinged to relative sector 23 about hinge axes parallel, in use, to longitudinal axis A1, and are activated by actuators 25 to rotate from the closed position shown in FIG. 6, to an open position (not shown) to release device 14 from pipeline P. Sectors 23, 24 have adjustable spacers 26 facing and configured to rest on pipeline P, and which are adjustable accurately to centre frame 15 about pipeline P.

Figure 6:
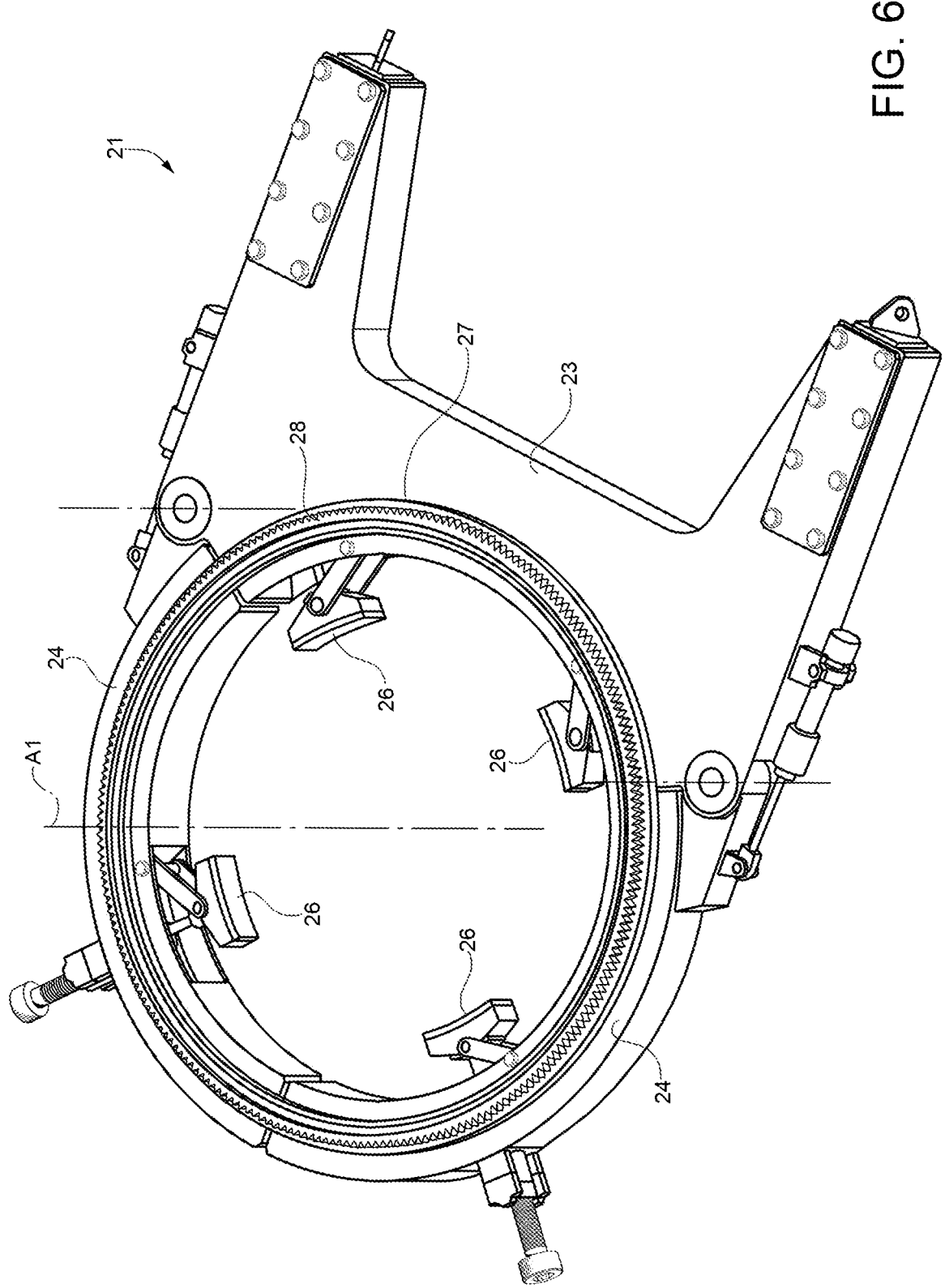
FIG. 6 shows a larger-scale elevation, with parts removed for clarity, of a component part of the FIG. 5 device.

With reference to FIG. 6, in the closed position, sectors 23, 24 of each gripper 21 define a circular guide 27 for carriage 16 (FIG. 5); and a circular rack 28 configured to cooperate with and drive carriage 16 (FIG. 5).

With reference to FIG. 5, frame 15 serves to connect device 14 selectively to pipeline P; to centre guide 27 with respect to longitudinal axis A1 of pipeline P; and to support and guide carriage 16 along an annular path.

Figure 7:
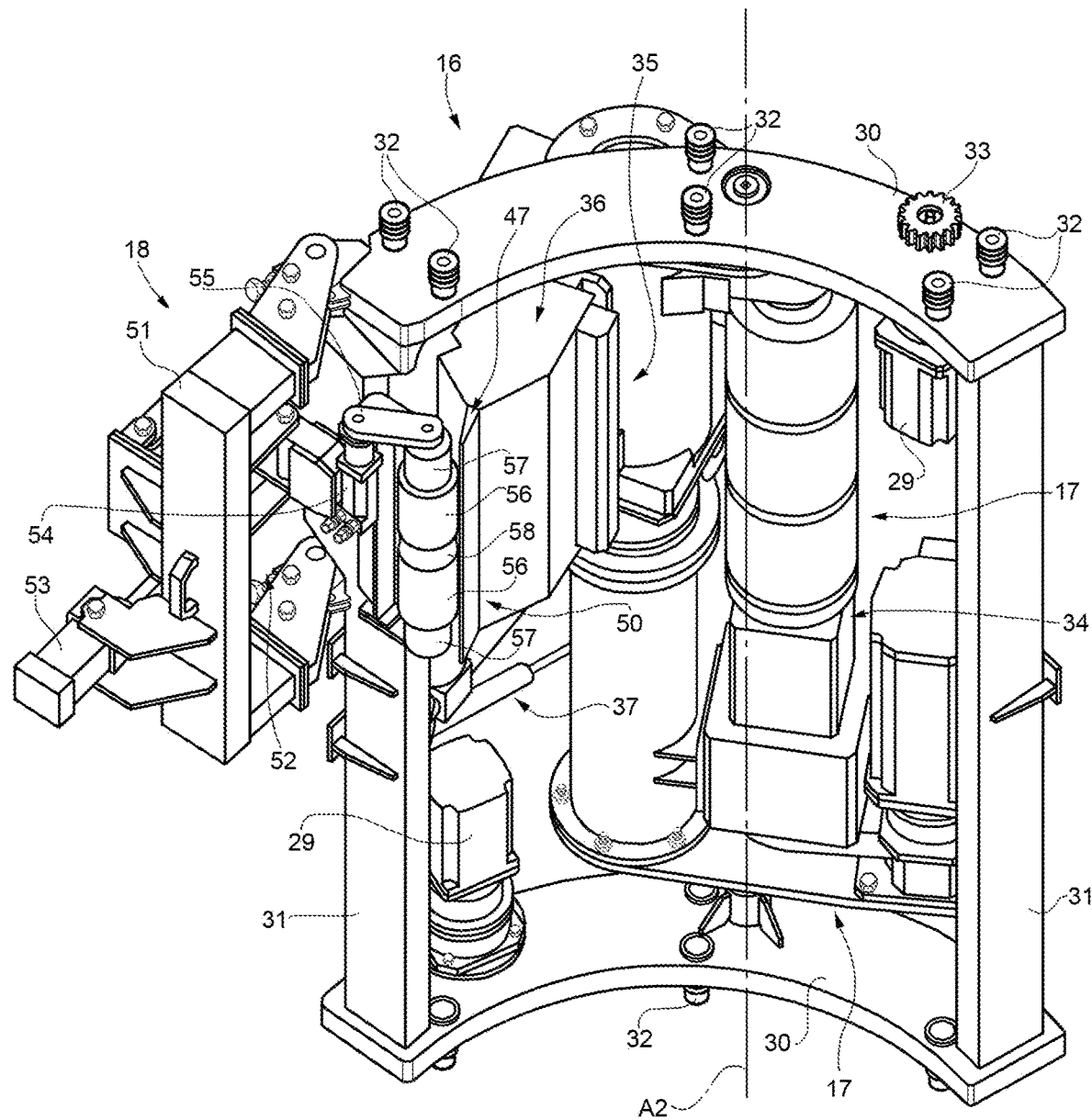
FIG. 7 shows a larger-scale view in perspective, with parts removed for clarity, of a carriage of the FIG. 5 device.

With reference to FIG. 7, carriage 16 comprises two actuators 29 configured to drive carriage 16; two facing, annular-sector-shaped plates 30; and two beams 31 connecting facing plates 30. The outer face of each plate 30 is fitted with rollers 32 configured to engage guide 27 of each gripper 21 (FIG. 6); and a pinion 33, which is activated by one of actuators 29 and configured to engage rack 28 (FIG. 6) to drive carriage 16 along the annular path about pipeline P (FIG. 5). Carriage 16 thus serves to support and drive plastifying and extrusion assembly 17 and rolling assembly 18 about pipeline P (FIG. 5).

Figure 8:
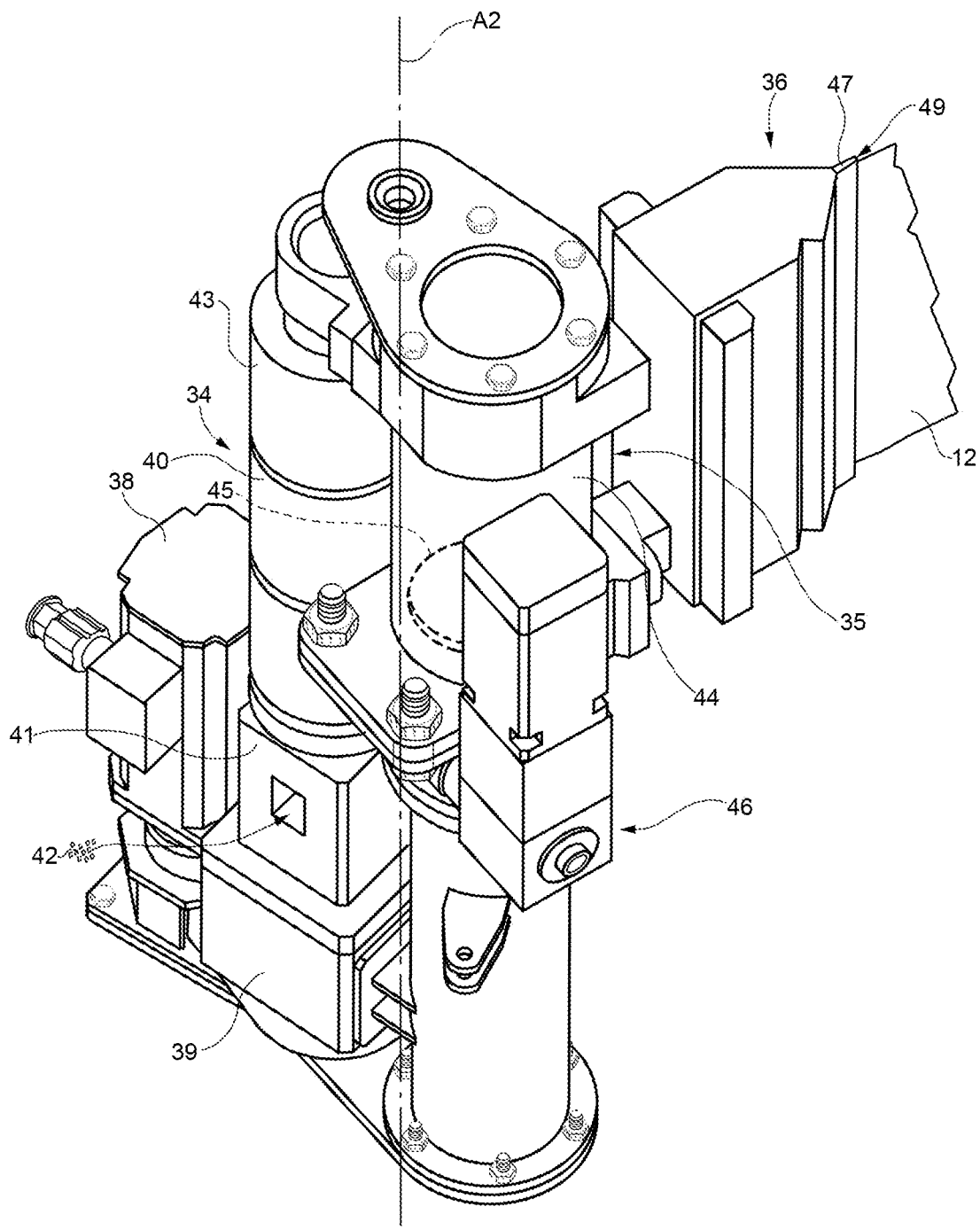
FIG. 8 shows a view in perspective, with parts removed for clarity, of a plastifying and extrusion assembly in accordance with the present disclosure.

With reference to FIG. 8, plastifying and extrusion assembly 17 comprises a plastifying device 34, a storage tank 35, and an extrusion head 36, which, in certain embodiments of the present disclosure, form one rigid block mounted on carriage 16, between plates 30, to rotate about an axis A2 (FIG. 7) parallel, in use, to longitudinal axis A1, to adjust the position of extrusion head 36 with respect to pipeline P (FIG. 5). Accordingly, and as shown in FIG. 7, plastifying and extrusion assembly 17 is connected to carriage 16 by an actuator 37 configured to accurately adjust the position of plastifying and extrusion assembly 17 about axis A2.

With reference to FIG. 8, plastifying device 34 is a screw type plastifier operated by a motor 38 and a reduction gear 39, and comprises a cylinder 40, in turn comprising a portion 41 with a feed inlet 42, and a portion 43. Portion 41 is cooled, such as by a water circuit, and portion 43 is heated, such as by electric resistors. Cylinder 40 is connected by a U fitting to storage tank 35, which comprises a chamber 44, such as a cylinder, in which a piston 45 is operated by, in certain embodiments, a electromechanical actuator 46 to alter the volume of storage tank 35. The rod (not shown) of piston 45 is, in certain embodiments, defined by a screw operated by a helical gear (neither shown).

To reduce the size and weight of plastifying device 34, the maximum capacity of soft polymer material of plastifying device 34 is less than that of extrusion head 36.

Figure 9:
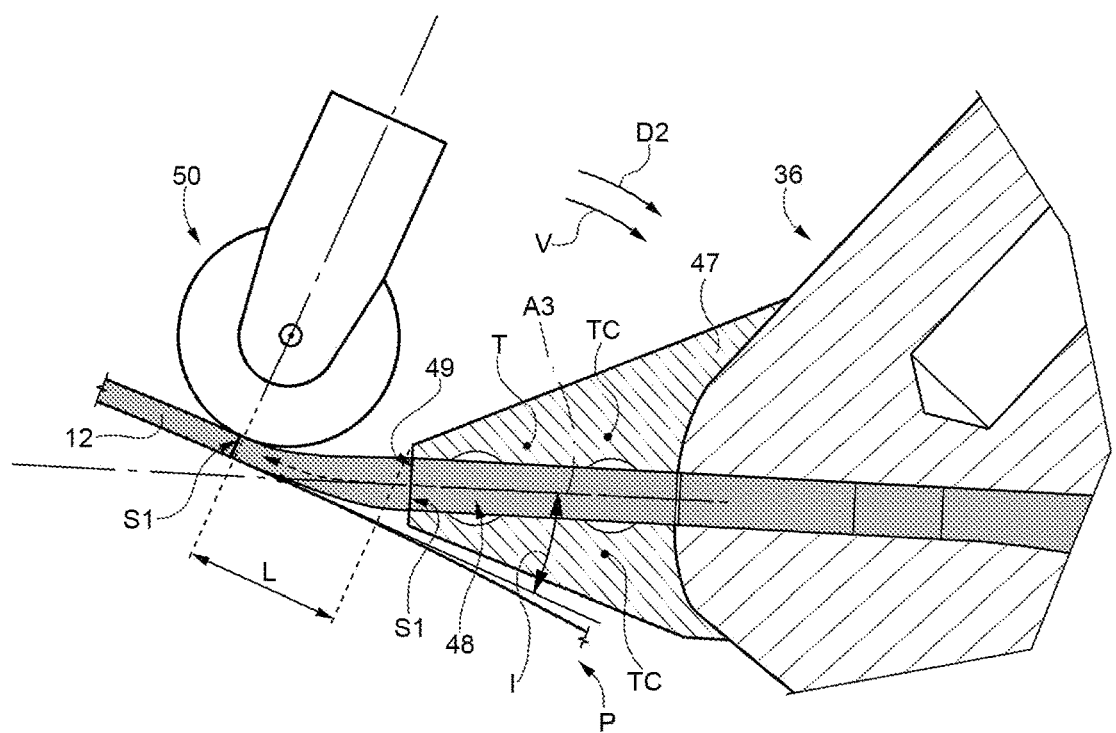
FIG. 9 shows a section, with parts removed for clarity, of a detail of the FIG. 5 device.

With reference to FIG. 9, extrusion head 36 is connected to an end extrusion die 47, in which is formed an extrusion channel 48 having an axis A3 and terminating with an extrusion port 49 in the form of an elongated slit. The shape and size of extrusion channel 48 and extrusion port 49 are what determine the shape and size of protective sheeting 12.

With reference to FIG. 7, rolling assembly 18 is fitted to carriage 16, and comprises a pressure roller 50; a supporting structure 51 fitted adjustably to carriage 16; an articulated connection 52—in particular, an articulated quadrilateral—connecting pressure roller 50 to supporting structure 51; and an actuator 53 between articulated connection 52 and supporting structure 51. Supporting structure 51 and actuator 53 permit accurate adjustment of the position of pressure roller 50 with respect to carriage 16 and die 47.

Rolling assembly 18 comprises an actuator 54 on the articulated connection; and a transmission 55 configured to connect actuator 54 to pressure roller 50, and configured to rotate pressure roller 50 at selectively varying speeds and in opposite rotation directions. Pressure roller 50 is made of rigid material, such as metal, and, in certain embodiments, has a contoured profile substantially defined by a centre portion 56 configured to contact cutback 8 and larger in diameter than two lateral portions 57 configured to contact protective sheeting 12 at coating 3. Pressure roller 50 has a contoured groove 58 formed in centre portion 56 to match the shape of annular weld bead 7 (FIG. 3).

In certain embodiments of the present disclosure (not shown in the drawings), the roller is made of deformable plastic material.

More specifically, and with reference to FIG. 9, end extrusion die 47 is prismatic in shape, with a roughly trapezoidal section defined by a short side, along which the extrusion port extends; a long side connected to extrusion head 36; and two oblique sides. The end extrusion die is, in certain embodiments, elongated in section, and the oblique sides slope relatively little with respect to axis A3 of extrusion channel 48, thus enabling one oblique side of die 47 and extrusion port 49 to be located close to pipeline P. Given the rotation direction D2 of die 47, protective sheeting 12 undergoes no sharp changes in direction as protective sheeting is applied to pipeline P, and there is only a very short time lapse in which protective sheeting 12 is unsupported by both end extrusion die 47 and the pipeline.

The configuration of end extrusion die 47 also enables pressure roller 50 to be positioned right next to end extrusion die 47 and so press protective sheeting 12 onto pipeline P. The close contact between protective sheeting 12, pipeline P, and pressure roller 50 rapidly cools protective sheeting 12, thus making protective sheeting less plastic and therefore less deformable.

In other words, given the configuration of end extrusion die 47, axis A3 of extrusion channel 48 can be positioned at a tilt angle I of less than 30° with respect to the tangent to pipeline P at the point at which axis A3 intersects the outer face of pipeline P. It should be appreciated that the best tilt angles achieved so far in tests conducted by the Applicant are around 20°.

In certain embodiments, the die houses thermocouples TC and temperature sensors T to control the exit temperature, and therefore plasticity, of protective sheeting 12 according to the material from which protective sheeting is made.

With reference to FIG. 5, hopper 19 is located above device 14, and is selectively connectable to feed inlet 42 (FIG. 8) to feed solid, in certain embodiments granular, polymer material to plastifying device 34 when carriage 16 is in a rest position over pipeline P.

Figure 10:
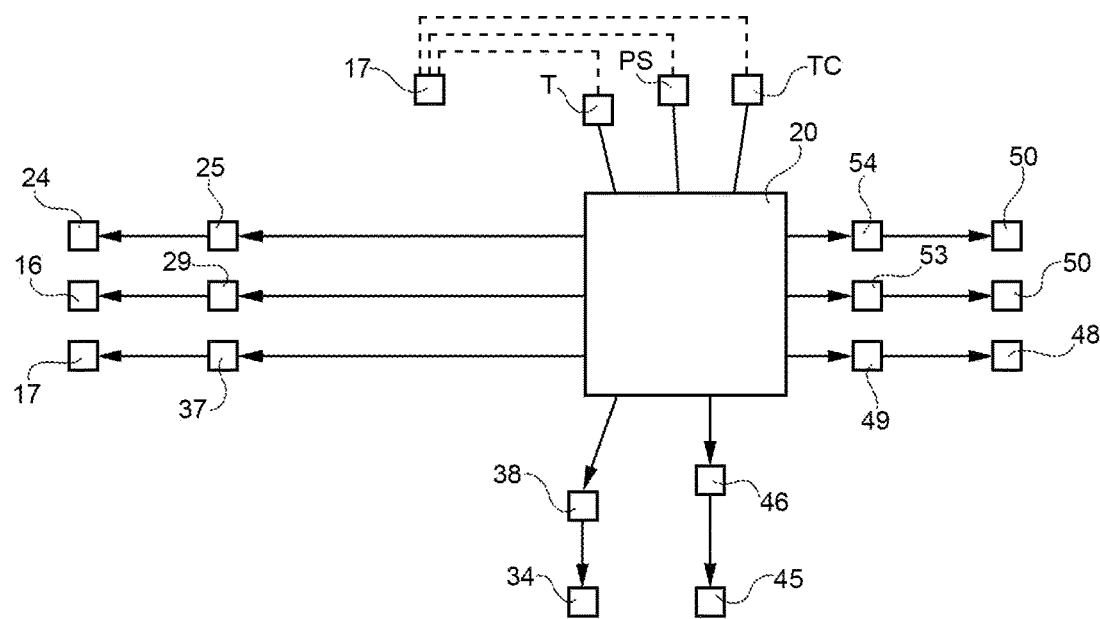
FIG. 10 shows a schematic of the control system configured to control the FIG. 5 device.

With reference to FIG. 10, computer 20 is connected to actuators 25 to selectively open and close sectors 24; to actuators 29 to drive carriage 16 along the annular path; to actuator 37 to adjust the tilt of plastifying and extrusion assembly 17; to motor 38 to operate plastifying device 34; to actuator 46 of piston 45; to actuator 53 to adjust the position of pressure roller 50; and to actuator 54 to rotate pressure roller 50.

Computer 20 is also connected to thermocouples TC fitted throughout plastifying and extrusion assembly 17 to keep the soft polymer material at the necessary temperatures to plastify and feed the soft polymer material to extrusion port 49; and to temperature sensors T and pressure sensors PS fitted to plastifying and extrusion assembly 17 to determine the condition of the soft polymer material and adjust thermocouples TC accordingly.

Computer 20 serves to control device 14 (FIG. 5) and the various operating stages via a control program based on test-acquired reference parameters memorized in the computer, and on operation-acquired parameters compared with the reference parameters.

With reference to FIG. 5, carriage 16 is supplied by a cable bundle 59, which comprises signal cables, power cables, compressed-air lines, and cooling circuit lines configured to cool feed inlet 42 (FIG. 8). With reference to FIG. 5, when released from device 14, pipeline P moves one step down, with respect to device 14, in direction D1 parallel to longitudinal axis A1. At this stage, carriage 16 is in the rest position, and the hopper feeds the polymer material to plastifying device 34, which, at this stage, plastifies and feeds the polymer material to storage tank 35. How long pipeline P remains stationary depends on the longest operations, such as welding and weld testing. Protective sheeting 12 can be extruded and applied in much less than the time pipeline P remains stationary, so the polymer material may conveniently be plastified as the pipeline advances and over part of the time pipeline remains stationary. After the pipeline advances, device 14 is clamped to pipeline P, with extrusion head 36 located at cutback 8 (FIG. 2).

With reference to FIG. 9, end extrusion die 47 expels protective sheeting 12, which is immediately pressed onto pipeline P by pressure roller 50. End extrusion die 47 and pressure roller 50 are adjusted and operated independently to adjust the respective distances from pipeline P as needed.

End extrusion die 47 and pressure roller 50 are moved about the pipeline in direction D2 at a speed V.

Speed V is a function of the extrusion speed of protective sheeting 12 and the diameter of pipeline P. Extrusion speed ranges between 5 m/min and 8 m/min, and averages 6.5 m/min. End extrusion die 47 and pressure roller 50 are located a distance L of less than 50 mm apart. At the above extrusion speed, a cross section S1 of protective sheeting 12 takes less than half a second to cover the 50 mm between extrusion port 49 and the gap between pipeline P and pressure roller 50. Even at a relatively really slow extrusion speed of 4 m/min, the time taken to cover the 50 mm distance is less than a second.

The plasticity of the extruded material is controlled to prevent gravitational deformation over a less than one second time lapse.

It should be appreciated that a critical moment when applying protective sheeting 12, however, is at the start, when the unsupported portion of protective sheeting 12 is subjected to gravity, and the end of protective sheeting 12 is not yet gripped between pressure roller 50 and pipeline P. In which case, in certain embodiments, it is best to move carriage 16 (FIG. 5) before commencing extrusion of sheeting 12.

Given the width of protective sheeting 12, one turn of carriage 16 about pipeline P is sufficient to restore coating 3 (FIG. 3). Accordingly, carriage 16 travels over 360° to enables pressure roller 50 to compress and possibly overlap the opposite ends of protective sheeting 12. Normally, the carriage travels an angle of 385°.

Once this operation is completed, carriage 16 is returned to the initial rest position by moving carriage along the annular path in the opposite direction to that travelled to apply protective sheeting 12. And, at this stage, pressure roller 50 is kept pressed on protective sheeting 12 and rotated in the opposite direction.

Once carriage 16 is in the initial rest position, device 14 is released from pipeline P, which is therefore free to move with respect to device 14; and plastifying and extrusion assembly 17 is ready to commence another cycle.

Figure 11:
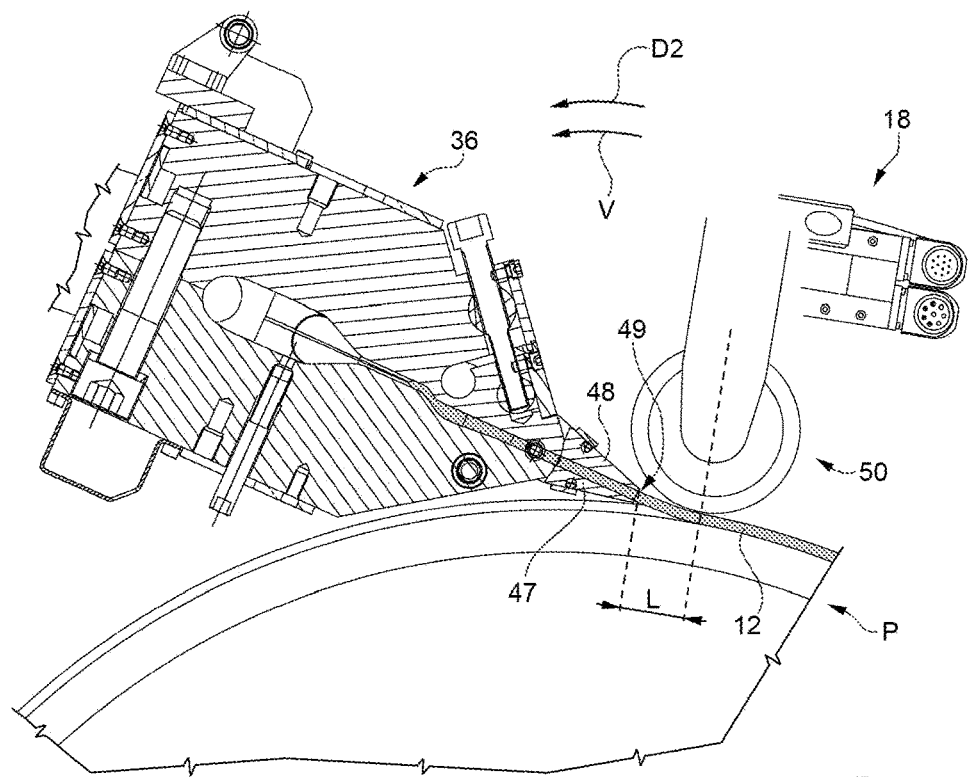
FIGS. 11 and 12 show sections, with parts removed for clarity, of a detail of the FIG. 5 device at two operating stages.
Figure 12:
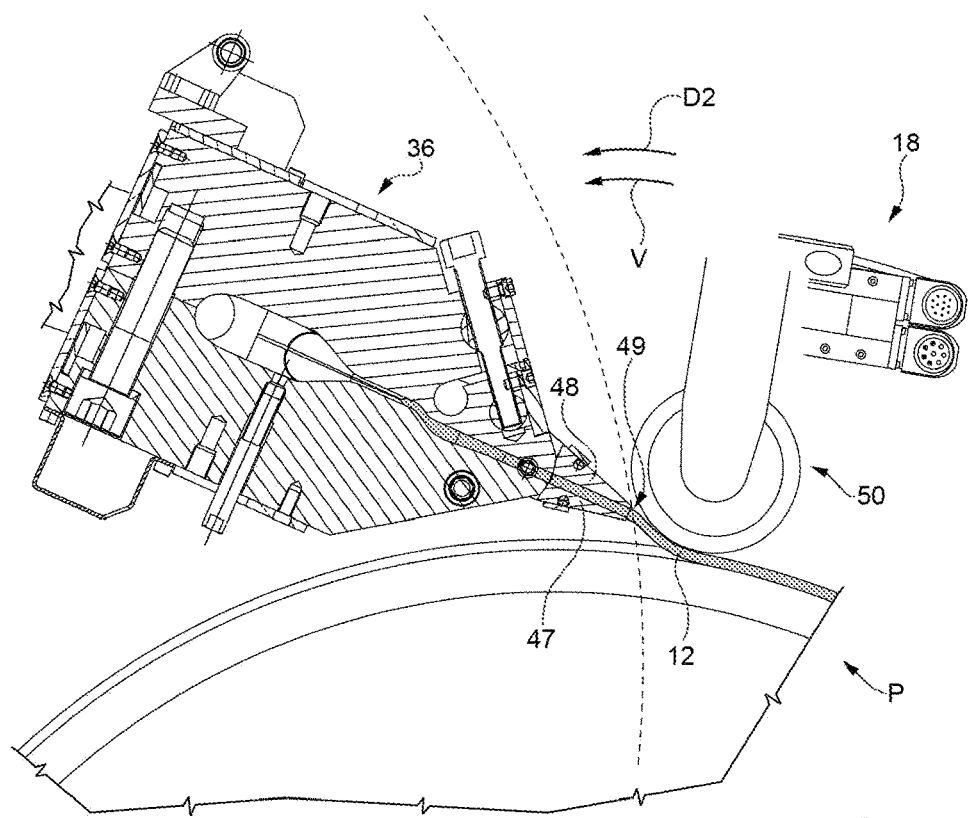

With reference to FIGS. 11 and 12, extrusion head 36 and, in particular, plastifying and extrusion assembly 17 can rotate about axis A2 (FIG. 5) with respect to carriage 16 to adjust the radial distance between extrusion port 49 and pipeline P independently of the position of pressure roller 50. This movement permits accurate adjustment of the distance between extrusion port 49 and pipeline P. Protective sheeting 12 may also be stretched and possibly torn off once protective sheeting is wound on. Protective sheeting 12 may also be torn off by reducing extrusion speed and maintaining the rotation speed of extrusion head 36 in direction D2 unchanged.

In the FIG. 13 embodiment, extrusion head 36 is equipped with an end extrusion die 60 configured to support a pressure roller 61, and which is substituted for end extrusion die 47. End extrusion die 60 houses an extrusion channel 62 terminating with an extrusion port 63. End extrusion die 60 has the same geometric characteristics as die 47, and is equipped with thermocouples TC and temperature sensors T configured to control the plasticity of the extruded protective sheeting 12. End extrusion die 60 differs from end extrusion die 47 by being configured to support pressure roller 61 directly. In the example shown, end extrusion die 60 comprises an arm supporting a rolling assembly 64, which comprises pressure roller 61 with the same characteristics as pressure roller 50, and an actuating system 65 configured to adjust the position of pressure roller 61 with respect to end extrusion die 60. This embodiment enables fast adjustment of device 14, when extrusion head 36 is not slender enough to be positioned close enough to pipeline P, and pressure roller 50 is positioned too far from extrusion head 36. End extrusion die 60 and pressure roller 61 thus define a kit by which a device mainly configured to apply protective sheeting to horizontal pipelines can be adapted quickly to perform field joint coating operations on a J-lay rig.

In this embodiment, device 14 is equipped with two pressure rollers 61 and 50 (the latter not shown in FIG. 13) which operate in rapid succession. Pressure roller 61 exerts less pressure than pressure roller 50, and serves to cool and adhere protective sheeting 12 to pipeline P, while pressure roller 50 (FIG. 7) serves to prevent the formation of air bubbles. In the FIG. 13 embodiment, a cross section S1 of protective sheeting 12 travels a relatively very short distance between its expulsion and the first point of contact with pipeline P.

In an alternative embodiment (not shown in the drawings), the end extrusion die partly incorporates the pressure roller, so that the roller defines part of the extrusion channel and part of the extrusion port, and the protective sheeting is therefore handed over to the pressure roller before leaving the extrusion channel.

Number 66 in FIG. 14 indicates a variation of the end extrusion die, which has the same geometric characteristics as end extrusion die 47, and is equipped with thermocouples TC and temperature sensors T. End extrusion die 66 comprises an extrusion channel 67; an extrusion port 68; and a shutter 69 housed in a seat 70 formed in end extrusion die 66.

Seat 70 and shutter 69 are located along extrusion channel 67 to selectively intercept the polymer material. In other words, extrusion channel 67 has a channel portion 71 upstream from seat 70, and a channel portion 72 downstream from seat 70.

Seat 70 is substantially cylindrical and extends about an axis A4 which, in the example shown, is perpendicular to axis A3 of extrusion channel 67.

Shutter 69 is elongated, extends along axis A4, and has a semicircular cross section. More specifically, shutter 69 has a cylindrical face 73, which forms a joint with seat 70; and a straight wall 74 detached from the seat. End extrusion die 66 comprises a rotary actuator 75 connected to shutter 69 to selectively rotate shutter 69 about axis A4 to open and close extrusion channel 67.

Channel portion 71 is bounded by two parallel faces 76 and 77 located a distance H1 apart, and channel portion 72 is bounded by two parallel faces 78 and 79 separated by a distance H2 smaller than H1.

In the example shown, face 76 is coplanar with face 78 and axis A4.

The above configuration forms two sealing areas between shutter 69 and seat 70, close to channel portion 72.

In certain embodiments, shutter 69 and seat 70 are located as close as possible to extrusion port 68, so that channel portion 72 is as relatively short as possible.

In certain embodiments, the walls of channel portion 72 are made of non-stick material.

In another alternative embodiment (not shown in the drawings), the plastifying and extrusion device is located at the work station, as opposed to being mounted on the carriage, and is only connected to the storage tank when the carriage is stationary (e.g., as the pipeline advances), as described in detail in PCT Patent Application No. 2008/071773, which, as regards the alternative method of feeding the storage tank, is included herein by way of reference.

Alternatively, the plastifying and extrusion device is connected to the storage tank by a flexible or semirigid hose.

Clearly, changes may be made to the embodiments of the present disclosure described with reference to the attached drawings, without, however, departing from the protective scope of the accompanying Claims. That is, various changes and modifications to the presently disclosed embodiments will be apparent to those skilled in the art. Such changes and modifications can be made without departing from the spirit and scope of the present subject matter and without dimin- The invention is claimed as follows:

1. A field joint coating method comprising:
   driving a carriage along an annular path about a pipeline;
   positioning an end extrusion die with respect to the pipeline, wherein the end extrusion die is fitted to the carriage and comprises a mounting face configured to fit to an extrusion head and two walls converging from the mounting face to an extrusion port, the end extrusion die defines an extrusion channel having at least one substantially straight portion extending along an axis which forms an angle of incidence of less than 30° with a line tangential to the pipeline, and the defined extrusion channel terminates at the extrusion port;
   adjusting the position of the extrusion port with respect to the pipeline between a minimum radial distance of 10 mm and a maximum radial distance of 20 mm;
   heating the end extrusion die based on a polymer material of which a protective sheeting is made;
   extruding and winding a profile of the protective sheeting of the polymer material about a coated cutback of the pipeline via the end extrusion die, wherein a cross section of the extruded protective sheeting has a first width and the cross section of the wound protective sheeting has the first width; and
   compressing, directly downstream from the end extrusion die and using a first pressure roller that is less than 50 mm away from the end extrusion die, the protective sheeting on the pipeline such that the protective sheeting adheres to the pipeline, wherein a time lapse between expulsion of the cross section of protective sheeting from the end extrusion die and the compression of said cross section of protective sheeting by the first pressure roller is less than one second.

2. The method of claim 1, wherein the pipeline is on a J-lay rig.

3. The method of claim 1, further comprising adjusting a distance between the first pressure roller and the end extrusion die as a function of an extrusion speed of the protective sheeting.

4. The method of claim 1, wherein the first pressure roller is powered and further comprising rotating the first pressure roller such that a surface speed of the first pressure roller equals a travelling speed of the end extrusion die.

5. The method of claim 1, further comprising additionally compressing the protective sheeting using a second pressure roller.

6. The method of claim 1, further comprising:
   extruding the protective sheeting at a designated extrusion speed, and
   advancing the end extrusion die at a speed substantially equal to the designated extrusion speed.

7. The method of claim 1, wherein the end extrusion die is heated as a function of an extrusion speed.

8. The method of claim 1, further comprising additionally compressing the protective sheeting on the pipeline downstream from the compression of the protective sheeting.

9. The method of claim 1, further comprising plastifying the polymer material to form the protective sheeting on board the carriage.

10. The method of claim 1, further comprising:
    plastifying the polymer material at a station a designated distance from the carriage; and
    transferring the plastified polymer material to the carriage during a stop stage of the carriage.

11. The method of claim 1, wherein driving the carriage starts before the extrusion of the protective sheeting.

12. The method of claim 1, wherein extruding the protective sheeting is stopped by an elongated shutter having a semicircular cross section and housed inside the end extrusion die.

13. The method of claim 1, further comprising simultaneously extruding and winding the profile of protective sheeting about the coated cutback of the pipeline.

14. A field joint coating device comprising:
    a carriage configured to move along an annular path about a pipeline;
    an end extrusion die fitted to the carriage and configured to extrude and wind a profile of protective sheeting of polymer material about a coated cutback of the pipeline, wherein a cross section of the extruded protective sheeting has a first width, the cross section of the wound protective sheeting has the first width, the end extrusion die comprises a temperature sensor, at least one heating element configured to control a plasticity of the protective sheeting of polymer material, a mounting face configured to fit to an extrusion head and two walls converging from the mounting face to an extrusion port, the end extrusion die defines an extrusion channel having at least one substantially straight portion extending along an axis which forms an angle of incidence of less than 30° with a line tangential to the pipeline, the defined extrusion channel terminates at the extrusion port, and the end extrusion die is selectively adjustable with respect to the carriage to position the extrusion port with respect to the pipeline between a minimum distance of 10 mm and a maximum distance of 20 mm; and
    a pressure roller connected to the carriage and configured to compress the protective sheeting on the pipeline such that the protective sheeting adheres to the pipeline, wherein a maximum distance between the pressure roller and the end extrusion die is less than 50 mm.

15. The field joint coating device of claim 14, wherein the pipeline is on a J-lay rig.

16. The field joint coating device of claim 14, wherein the pressure roller is adjustably connected to the carriage to adjust a distance between the end extrusion die and the pressure roller.

17. The field joint coating device of claim 14, wherein the pressure roller is powered, and adjustable in speed to rotate at a surface speed equal to a travelling speed of the end extrusion die.

18. The field joint coating device of claim 14, wherein the end extrusion die is selectively tiltable with respect to the pipeline.

19. The field joint coating device of claim 14, wherein the end extrusion die further comprises an elongated shutter having a semicircular cross section and housed in a seat along the extrusion channel defined by the end extrusion die.

20. The field joint coating device of claim 19, wherein the seat is cylindrical, the shutter is configured to rotate about an axis, and the shutter has a face configured to form a sealing area with the seat.

21. The field joint coating device of claim 19, wherein the extrusion channel is divided by the seat into a first channel portion having a first height and being located upstream from the seat, and a second channel portion having a second height lower than the first height and being located downstream from the seat.

22. The field joint coating device of claim 14, wherein the at least one heating element is adjustable based on the polymer material of which the protective sheeting is made.

23. The field joint coating device of claim 14, wherein the pressure roller is fitted directly to the end extrusion die.

24. The field joint coating device of claim 14, further comprising another pressure roller configured to additionally compress the protective sheeting on the pipeline downstream from the pressure roller.

25. The field joint coating device of claim 14, further comprising a plastifying and extrusion assembly on board the carriage.

26. The field joint coating device of claim 14, wherein the end extrusion die is configured to simultaneously extrude and wind the profile of protective sheeting of polymer material about the coated cutback of the pipeline.

27. A field joint coating work station comprising:
a pipeline polymer material protective sheeting application device including:
a carriage configured to move along an annular path about a pipeline;
an end extrusion die fitted to the carriage and configured to extrude and wind a profile of protective sheeting of polymer material about a coated cutback of the pipeline, wherein a cross section of the extruded protective sheeting has a first width, the cross section of the wound protective sheeting has the first width, the end extrusion die comprises at least one heating element adjustable as a function of an extrusion speed, a mounting face configured to fit to an extrusion head and two walls converging from the mounting face to an extrusion port, the end extrusion die defines an extrusion channel having at least one substantially straight portion extending along an axis which forms an angle of incidence of less than 30° with a line tangential to the pipeline, the defined extrusion channel terminates at the extrusion port, and the end extrusion die is selectively adjustable with respect to the carriage to position the extrusion port with respect to the pipeline between a minimum distance of 10 mm and a maximum distance of 20 mm; and
a pressure roller connected to the carriage and configured to compress the protective sheeting on the pipeline such that the protective sheeting adheres to the pipeline, wherein a maximum distance between the pressure roller and the end extrusion die is less than 50 mm.

28. The field joint coating work station of claim 27, wherein the end extrusion die is configured to simultaneously extrude and wind the profile of protective sheeting of polymer material about the coated cutback of the pipeline.

29. A system comprising:
at least one processor; and
a memory device which stores a plurality of instructions, which when executed by the at least one processor, cause the at least one processor to:
drive a carriage of a pipeline polymer material protective sheeting application device along an annular path about a pipeline;
position an end extrusion die of the pipeline polymer material protective sheeting application device with respect to the pipeline, wherein the end extrusion die is fitted to the carriage and comprises a mounting face configured to fit to an extrusion head and two walls converging from the mounting face to an extrusion port, the end extrusion die defines an extrusion channel having at least one substantially straight portion extending along an axis which forms an angle of incidence of less than 30° with a line tangential to the pipeline, and the defined extrusion channel terminates at the extrusion port;
adjust the position of the extrusion port with respect to the pipeline between a minimum radial distance of 10 mm and a maximum radial distance of 20 mm;
extrude and wind a profile of protective sheeting about a coated cutback of the pipeline via the end extrusion die, wherein a cross section of the extruded protective sheeting has a first width and the cross section of the wound protective sheeting has the first width;
directly downstream from the end extrusion die compress, via a pressure roller of the pipeline polymer material protective sheeting application device, the protective sheeting on the pipeline such that the protective sheeting adheres to the pipeline, wherein a time lapse between expulsion of the cross section of protective sheeting from the end extrusion die and the compression of said cross section of protective sheeting is less than one second, the pressure roller is connected to the carriage, and the pressure roller is a maximum distance of less than 50 mm away from the end extrusion die; and
reduce an extrusion speed without changing a rotation speed of the extrusion head to stretch and tear off the wound protective sheeting.

30. The system of claim 29, wherein when executed by the at least one processor, the plurality of instructions cause the at least one processor to cause a simultaneous extrusion and winding of the profile of the protective sheeting about the coated cutback of the pipeline.

31. The field joint coating device of claim 14, wherein the at least one heating element is adjustable as a function of an extrusion speed.

32. The field joint coating work station of claim 27, wherein the at least one heating element is adjustable based on the polymer material of which the protective sheeting is made.

33. The system of claim 29, wherein the pipeline polymer material protective sheeting application device includes at least one heating element adjustable as a function of an extrusion speed.

34. The method of claim 1, wherein extruding the protective sheeting comprises actuating a piston oriented transverse to a direction of extrusion.

* * * * *